(12) United States Patent
Pittala et al.

(10) Patent No.: US 12,515,263 B2
(45) Date of Patent: Jan. 6, 2026

(54) MILLING TOOL WITH HELIX ANGLE TRANSITION

(71) Applicant: AB SANDVIK COROMANT, Sandviken (SE)

(72) Inventors: Gaetano Pittala, Sandviken (SE); Anders Liljerehn, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 666 days.

(21) Appl. No.: 17/774,826

(22) PCT Filed: Oct. 21, 2020

(86) PCT No.: PCT/EP2020/079643
§ 371 (c)(1),
(2) Date: May 5, 2022

(87) PCT Pub. No.: WO2021/089328
PCT Pub. Date: May 14, 2021

(65) Prior Publication Data
US 2022/0402048 A1 Dec. 22, 2022

(30) Foreign Application Priority Data
Nov. 6, 2019 (EP) .................................. 19207415

(51) Int. Cl.
*B23C 5/10* (2006.01)
(52) U.S. Cl.
CPC ........ *B23C 5/10* (2013.01); *B23C 2210/0485* (2013.01); *B23C 2210/086* (2013.01); *B23C 2210/282* (2013.01)
(58) Field of Classification Search
CPC .......... B23C 2210/28; B23C 2210/282; B23C 2210/0485; B23C 2210/0492; B23C 5/10;
(Continued)

(56) References Cited

U.S. PATENT DOCUMENTS 3,913,196 A * 10/1975 Maday ................. B23D 61/003
408/230
4,507,028 A * 3/1985 Matsushita ............. B23B 51/08
408/229
(Continued)

FOREIGN PATENT DOCUMENTS

GB 469235 A 7/1937
JP S6389214 A 4/1988
(Continued)

OTHER PUBLICATIONS

Translation of WO 2006101461, Hrovatic, Milling Cutter, Sep. 28, 2006, pp. 5 (Year: 2006).*
(Continued)

*Primary Examiner* — Nicole N Ramos
(74) *Attorney, Agent, or Firm* — Corinne R. Gorski (57) ABSTRACT

A milling tool having a front end, a rear end, a longitudinal axis extending therebetween, a shank portion and a cutting portion. The cutting portion includes a plurality of teeth separated by a corresponding number of flutes. Each tooth extends axially along the cutting portion following a curved helical path around the longitudinal axis, and extends at a first helix angle from the front end to a helix transition, and at a second helix angle from the helix transition towards the shank portion. The second helix angle is greater than the first helix angle by at least 2° and at most 15°. The first helix angle ($\alpha$) is $33° \leq \alpha \leq 50°$, and the second helix angle ($\beta$) is $40° \leq \beta \leq 55°$, and wherein the helix transition is axially located from the front end by 0.2 to 0.7 of the longitudinal length of the cutting portion.

14 Claims, 4 Drawing Sheets

(58) Field of Classification Search
CPC ............ B23C 2210/48; B23C 2226/27; B23C 2210/54; B23C 2210/40; B23C 2210/04
See application file for complete search history.

(56) References Cited

U.S. PATENT DOCUMENTS

| | | | | |
|---|---|---|---|---|
| 4,572,714 | A * | 2/1986 | Suzuki | B23B 51/02 |
| | | | | 407/53 |
| 4,963,059 | A | 10/1990 | Hiyama | |
| 6,991,409 | B2 * | 1/2006 | Noland | B23C 5/1009 |
| | | | | 407/59 |
| 7,101,125 | B2 * | 9/2006 | Borschert | B23B 51/02 |
| | | | | 408/230 |
| 7,223,053 | B2 * | 5/2007 | Flynn | B23C 5/10 |
| | | | | 407/53 |
| 9,393,629 | B2 * | 7/2016 | Barry | B23P 15/34 |
| 10,486,246 | B2 * | 11/2019 | Shpigelman | B23C 5/10 |
| 10,821,526 | B2 * | 11/2020 | Hatano | B23C 5/10 |
| 2003/0118411 | A1 * | 6/2003 | Flynn | B23C 5/10 |
| | | | | 407/53 |
| 2013/0294852 | A1 * | 11/2013 | Winebrenner | A61K 31/573 |
| | | | | 407/54 |
| 2016/0297012 | A1 * | 10/2016 | Davis | B23C 5/10 |
| 2017/0028482 | A1 * | 2/2017 | Boulakhov | B23C 5/10 |
| 2020/0198025 | A1 * | 6/2020 | Takatake | B23C 5/10 |
| 2020/0230714 | A1 * | 7/2020 | Rimchala | B23B 51/02 |

FOREIGN PATENT DOCUMENTS

| | | | | |
|---|---|---|---|---|
| WO | WO-2006101461 | A1 * | 9/2006 | ............... B23C 5/10 |
| WO | WO-2018166889 | A1 * | 9/2018 | ............... B22F 3/20 |

OTHER PUBLICATIONS

Translation of WO 2018166889, Barbist, Tool body and method for production thereof, Sep. 20, 2018, pp. 19 (Year: 2018).*
Budak et al. "Peripheral milling conditions for improved dimensional accuracy". (Int. J. Mach. Tools Manuf. 1994, vol. 34, pp. 907-918.

* cited by examiner

MILLING TOOL WITH HELIX ANGLE TRANSITION

RELATED APPLICATION DATA

This application is a § 371 National Stage Application of PCT International Application No. PCT/EP2020/079643 filed Oct. 21, 2020 claiming priority to EP 19207415.1 filed Nov. 6, 2019.

TECHNICAL FIELD

The invention relates to a milling tool and to a method for machining a surface of a workpiece.

BACKGROUND ART

Milling tools, such as solid end mills, may be used for machining a surface of a workpiece. The machining process is often controlled by a CNC machine tool, to which the milling tool is arranged.

Various factors can affect the quality of the machined surface of the workpiece. For example, bending of the milling tool, or dynamic variations of some parameters related to the cutting process, can result in a machined surface that is not perfectly straight and flat. The deviation of the machined surface from the desired flat, straight surface may be referred to as a "form error" and may comprise multiple kinds of imperfections. For example, dynamic variations of some parameter may cause periodic and/or random irregularities in the machined surface.

The periodically varying engagement of cutting edges with the workpiece, which always occurs to some extent in milling operations, results in a variation of the force between the cutting tool and the workpiece. Such force variations may result in an increased form error. This is for example discussed in Budak, E.; Altintas, Y—"*Peripheral milling conditions for improved dimensional accuracy*" (*Int. J. Mach. Tools Manuf.* 1994, Vol. 34, pp 907-918), in which a framework describing force variations during milling is presented, as well as conclusions on how the cutting conditions, such as the feed rate and width of cut, could be optimally selected for obtaining an increased material removal rate without sacrificing the dimensional accuracy of the finished product.

However, even when applying the most optimal cutting conditions possible, the prior art milling tools can still not produce completely smooth and straight surfaces. Hence, there is a need for milling tools that can produce machined surfaces of higher quality.

SUMMARY

It is an object of the present invention to mitigate the shortcomings of the prior art and to provide a method and a milling tool for generating machined surfaces of improved quality.

Thus, according to a first aspect, the invention relates to a milling tool having a front end, a rear end, and a longitudinal axis extending therebetween. The milling tool comprises
  a shank portion and
  a cutting portion, which
    extends along the longitudinal axis from the front end towards the shank portion, and
    comprises a plurality of teeth separated from each other by a corresponding number of flutes, wherein
    the teeth extend axially along the cutting portion following a curved helical path around the longitudinal axis.

The milling tool is characterized in that each tooth extends
  at a first helix angle $\alpha$ from the front end to a helix transition, and
  at a second helix angle $\beta$ from the helix transition towards the shank portion, wherein
    the second helix angle $\beta$ is greater than the first helix angle $\alpha$ by at least 2° and at most 15°,
    the first helix angle $\alpha$ fulfills $33° \leq \alpha \leq 50°$,
    the second helix angle $\beta$ fulfills $40° \leq \beta \leq 55°$, and
    the helix transition is axially located within a distance, from the front end, of 0.2 to 0.7 of the longitudinal length of the cutting portion.

In applications where milling is performed with a relatively large axial depth of cut, and/or with a tool having high helix and/or large number of cutting teeth, it is common that two or more cutting edges simultaneously are engaged with the workpiece when the wall surface is generated. In such situations, i.e. wherein at least one cutting edge is always engaged in cut during the generation of the wall surface, the displacement, or more accurately the deflection, of the milling tool involves both a static and a dynamic component. The static component is a consequence of that at least one cutting edge will always be in engagement with the workpiece. Nonetheless, the cutting force will still vary when the different cutting edges go in and out of engagement with the workpiece. The static force component will contribute to the global angular error while the dynamic (i.e. time varying) component will manifest the irregularities on the machined wall surface of the workpiece.

The inventors have found that the time varying cutting force that is normal to the generated wall surface stands in direct relation to the generated surface error, and that this force variation can be reduced in machining situations where two cutting edges are in simultaneous engagement with a workpiece at different axial positions along the depth of cut, if the helix angle at the respective two axial positions are different from each other and related to each other according to the above. As discussed, the variation in force appears as a cutting edge either enters or exits the workpiece. For each tooth of a helical end mill, the entry will occur in a zone axially located in one end of the active part of the cutting portion, and the exit will occur in a zone axially located at the opposite end of the active part of the cutting portion. For example, the entry may occur at the front end of the end mill and the exit may occur at a position corresponding to the cutting depth (or vice versa, depending on the direction of cut relative the direction of helix). In these entry- and exit zones, both the chip thickness and the length of the cutting edge in contact with the workpiece (herein referred to as "contact length") will vary. For example, the contact length will increase during entry and decrease during exit. However, the contact length and chip thickness (and thus the cutting force) will remain the same in the region between the entry zone and the exit zone. The inventors have found that a transition between two different helix angles, arranged such that the helix angle at the entry zone is different than the helix angle at the exit zone, may balance the forces during the entry and exit phases such that the force variation can be reduced.

The helix angle should be different at two axially consecutive parts of each cutting edge, but constant within each such part to always maintain the optimal helix relationship between the corresponding portions of the cutting edges that are simultaneously engaged with the workpiece. Such design is also beneficial from a production point of view in that the tools are relatively easy to manufacture. The transition between the helix angles should be relatively short and axially located in a position such that both helix angles will be active during milling for a great number of different milling operations, while ensuring manufacturability of the cutting tool (i.e. the transition should not be too close to either of the shank or the tool tip).

Hence, with a configuration as defined above, the difference between the minimum force (i.e. the static force component) and the maximum force will be reduced. As a consequence, the generated surface error will also be reduced.

The milling tool may be made of cemented carbide.

According to some embodiments, the first helix angle α may be within the range 38°≤α≤45°, and the second helix angle β may be within the range 45°≤β≤50. It has been found that particularly good results, both regarding functionality and design, may be obtained within these ranges.

According to some embodiments, the second helix angle β may be 3°, 7°, 8° or 12° greater than the first helix angle α.

The longitudinal length of the cutting portion of the milling tool may be at least 3 times the diameter of the cutting portion. Even though the design according to the present disclosure is applicable in view of many different milling tools, the effect is particularly notable for milling operations wherein a long edge cutter and large depth of cut is used, where force variations may result in substantial vibration of the tool. For example, the longitudinal length of the cutting portion may be between 4 and 6 times the diameter of the cutting portion, such as, for example, five times, or substantially 5 times, the diameter of the cutting portion.

The present disclosure may be applied in relation to milling cutters having any number of teeth. For example, the milling tool may have five or six teeth. Five teeth may provide good results when using a relatively large axial depth of cut and may therefore be beneficial within the context of the present disclosure. Six teeth may also provide good results.

The helix transition may be axially located within a distance, from the front end, of 0.4 to 0.7 of the longitudinal length of the cutting portion. For example, the transition may be axially located within a distance, from the front end, of 0.4 to 0.65 of the longitudinal length of the cutting portion. Thus, the transition may be axially located in the middle of, or close to the middle of, the cutting portion.

The helix transition may comprise a transition region extending in the axial direction from a first axial point of the cutting portion at which helix transition starts to a second axial point of the cutting portion at which helix transition ends. The transition may be linear, i.e. such that the helix angle changes continuously and uniformly over the extension of the transition region. The transition region may have an axial length between 0.05 and 0.2 times the axial length of the cutting portion. The transition region will thus provide a smooth transition between the first and second helix angles. A smooth transition may have various advantages, for example by simplifying production and increasing the strength of the tool.

An axial center of the helix transition along the longitudinal axis, i.e. the axial center of the transition region, may be located at a transition center point. The transition center point may, for example, be located at an axial distance from the front end that is greater than 0.45 times the longitudinal length of the cutting portion and smaller than 0.6 times thereof.

According to another aspect, the invention relates to a method for machining a surface of a workpiece with a milling tool, wherein the method comprises:
machining the workpiece using a cutting depth in a direction parallel to the longitudinal axis of the milling tool that is, for each tooth, larger than the axial distance from the front end of the milling tool to the point of the tooth at which the second helix angle begins.

The cutting depth may be the same, or substantially the same, as the axial length of the cutting portion, i.e. the maximum cutting depth possible. With such large cutting depth, the form error that would arise with a conventional end mill is the greatest, and the effect of using a milling tool according to the present disclosure most noticeable. Accordingly, the parameters of a milling tool according to the present disclosure may be selected in view of the maximum cutting depth.

The method may comprise machining a workpiece with a width of cut in a direction transversal to the longitudinal axis (i.e. radial width of cut) that is at most 7% of the diameter of the cutting portion. This corresponds to finishing or semi-finishing operations, for which the effect of using a milling tool according to the present disclosure is likely to be most prominent. As an example, the radial width of cut may be between 0.5% and 2% of the diameter of the cutting portion.

According to another aspect, the invention relates to a method for designing a milling tool having a front end, a rear end, and a longitudinal axis extending therebetween, wherein the milling tool comprises
a shank portion and
a cutting portion, which
extends along the longitudinal axis from the front end towards the shank portion, and
comprises a plurality of teeth separated from each other by a corresponding number of flutes, wherein
the teeth extend axially along the cutting portion following a curved helical path around the longitudinal axis,
wherein each tooth extends
at a first helix angle α from the front end to a helix transition, and
at a second helix angle β from the helix transition towards the shank portion, and
wherein the method comprises the steps of:
subjecting a force algorithm, designed for calculation of simulated cutting force during simulated machining of a surface of a workpiece with a milling tool, to an optimization routine in which the objective is to minimize the difference between the maximum force and the minimum force in a direction normal to the surface of the workpiece, and in which the variables are at least two of:
the first helix angle α,
the second helix angle β, and
an axial location of the helix transition along the cutting portion,
and,
designing the milling tool on basis of the combinations of the first helix angle α, the second helix angle β, and the axial location of the helix transition, found to be optimal.

Thereby, optimal combinations of first and second helix angles α and β, and axial locations of the transition therebetween, can be found for various milling tools of different dimensions and characteristics, and for various applications. The method may result in milling tools according to the disclosure herein, i.e. milling tools for which

- the second helix angle β is greater than the first helix angle α by at least 2° and at most 15°,
- the first helix angle α fulfills 33°≤α≤50°,
- the second helix angle β fulfills 40°≤β≤55°, and
- the helix transition is axially located within a distance, from the front end, of 0.2 to 0.7 of the longitudinal length of the cutting portion.

The method for designing a milling tool may be carried out using a computer, i.e. the method is computer-implemented. According to some embodiments, the variables in the optimization routine includes all of the first helix angle α, the second helix angle β, and the axial location of the helix transition along the cutting portion.

According to another aspect, the invention relates to a computer program having instructions which when executed by a computing device or system cause the computing device or system to perform the method for designing a milling tool.

BRIEF DESCRIPTION OF DRAWINGS

All the figures are schematic, not necessarily to scale, and generally only show parts which are necessary in order to elucidate the respective embodiments, whereas other parts may be omitted or merely suggested. Unless otherwise indicated, like reference numerals refer to like parts in different figures.

DETAILED DESCRIPTION OF EMBODIMENTS

In the following, a process for estimating cutting forces and optimizing the tool geometry for reducing force variation is described.

The mechanistic model predicting the cutting forces is constructed on a modified Kienzle cutting force model structure which relies on constant coefficients, $K_{q1}$, $m_q$ and $\gamma_q^{corr}$, describing the workpiece materials cutting resistant, $K_q(h)$ in relation to the un-cut chip thickness, h, and cutting-edge's length in contact, b, and the rake angle, γ. Here subscript q denotes the directional orientation, q=[t, r, a], of the cutting force which corresponds to the tangential, radial and axial direction of a tool fixed coordinate system.

On general form the force equation is defined as $$F_q = k_q(h)_q b h$$

where the un-cut chip thickness h is related to the feed per tooth $f_z$ and approach angle κ as $h = f_z \sin κ$, and edge contact length b is related to the depth of cut $a_p$ as $$b = \frac{a_p}{\sin κ}.$$

The chip thickness dependent cutting resistances, $k(h)_q$, is defined as $$k(h)_q = k_{q1} h^{-m_q}\left(1 - \frac{\gamma}{\gamma_q^{corr}}\right)$$

where $k_{q1}$ is the cutting resistance at an uncut chip thickness of 1 mm and $m_q$ is the slope coefficient describing the exponential cutting resistance relation to the un-cut chip thickness and $\gamma_q^{corr}$ corrects for variations in radial rake angle.

This general cutting force description may be used as foundation for a milling force algorithm utilized in the optimization of the variable helix.

Figure 1:
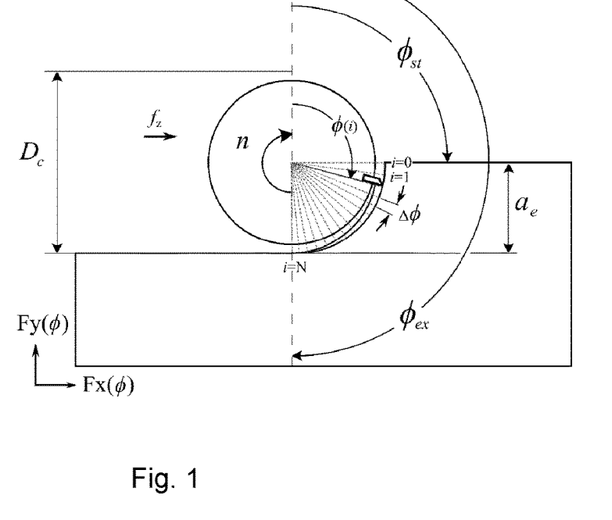
FIGS. 1-4 illustrate the parameters used for quantifying the cutting forces.

To apply the generalized Kienzle model to the time varying cutting conditions found in milling, the first step is to discretize the chip thickness variations. FIG. 1 shows this discretization. The discretization describes the un-cut chip thickness over incremental angular rotation steps, Δϕ, over one engagement cycle, wherein $f_z$ is feed per tooth, $F_x$ is the feed force, $F_y$ is the normal force, $D_C$ is the cutting tool diameter, $a_e$ is the radial width of cut, n is the spindle speed, $\Phi_{st}$ is the entry angle, and $\Phi_{ex}$ is the exit angle.

Figures 3, 4:
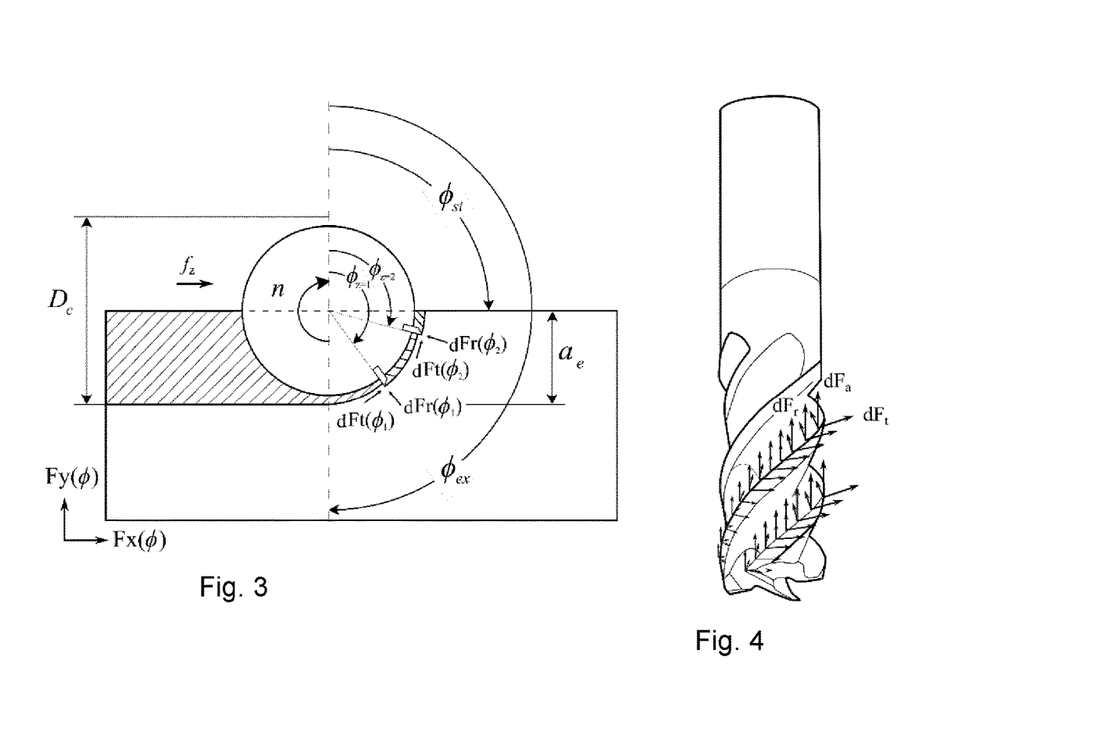

The feed force $F_x$ and the normal force $F_y$ are related to the radial force $F_r$ and the tangential force $F_t$ (indicated in FIGS. 3-4) according to:

$$F_x = -F_t \cos \phi - F_r \sin \phi$$

$$F_y = F_t \sin \phi - F_r \cos \phi$$

Figure 2:
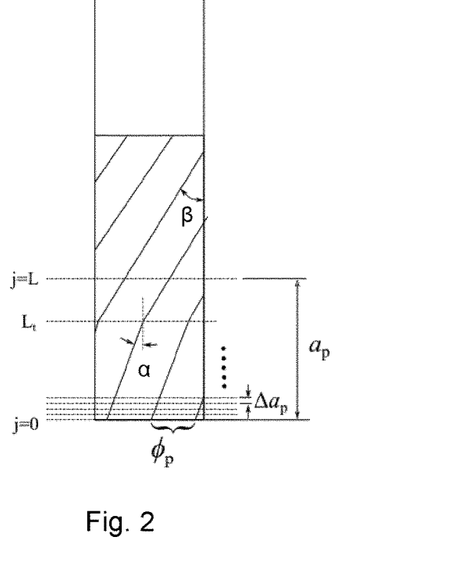

The helix angle of the tool results in a gradual cutting engagement. The tool body hence needs to be discretized along its axial direction as well, see FIG. 2, wherein the cutting depth $a_p$ is discretized into axial steps $\Delta a_p$. This discretization allows for a variation in helix angle both gradually or, as in this optimization approach, at a discreet point, $L_T$ where the helix angle transitions from α to β. The cutter pitch angle, $\Phi_p$, is also indicated in FIG. 2.

This discretization approach may be used to generalize the milling force model to a versatile and easy to solve numerical structure where the cutting force contribution can be calculated for multiple cutting edges at incremental positions during the rotation, see FIG. 3, and over the total axial depth of cut, as displayed in FIG. 4. In these figures, $F_t$ denotes the tangential force, $F_r$ the radial force and $F_a$ the axial force.

The general framework of an exemplary force algorithm that may be used is presented below.

Inputs:
Cutting Conditions
  $a_p$ axial depth of cut [mm]
  $f_z$ feed per tooth [mm/tooth]
  n spindle speed [rev/min]
  $a_e$ radial width of cut [mm]
Tool Geometry
  $D_c$ cutting tool diameter [mm]
  $L_T$ transition point between first and second helix [mm]
  z number of cutting teeth's [−]

α first helix angle [rad]
β second helix angle [rad]
Δϕ integration angle [rad]
Δa_p integration height [mm]
λ radial rake angle [deg]

Workpiece Material Model $k_{c1}$, $m_c$, $\lambda_c^{corr}$ cutting constants tangential direction
$k_{r1}$, $m_r$, $\lambda_r^{corr}$ cutting constants radial direction Variables $\phi_p = \dfrac{2\pi}{z}$    Cutter pitch angle [rad]

$K = \dfrac{2\pi}{\Delta\phi}$    number of angular integration steps $L = \dfrac{a_p}{\Delta a_p}$    number of axial integration steps Conditional Variables
Up Milling $\phi_{st} = \pi - \cos^{-1}\left(\dfrac{\frac{D_c}{2} - a_e}{\frac{D_c}{2}}\right)$    entry angle [rad]

$\phi_{ex} = \pi$    exit angle [rad]

Down Milling $\phi_{st} = \pi$    entry angle [rad]

$\phi_{ex} = \pi - \cos^{-1}\left(\dfrac{\frac{D_c}{2} - a_e}{\frac{D_c}{2}}\right)$    exit angle [rad]

| Algorithm: | |
|---|---|
| for i = 1 to K | Angular integration loop |
| ϕ(i) = ϕ_st + iΔϕ | Immersion angle of flutes bottom edge |
| $F_x(i) = F_y(i) = F_t(i) = F_r(i) = 0$ | Initialize the force integration register |
| for k = 1 to N | Force contribution of all teeth |
| $\phi_1 = \phi(i) + (k-1)\phi_p$ | Immersion angle of tooth k |
| $\phi_2 = \phi_1$ | Memorize the present immersion |
| for j = 1 to L | Integrate along the axial depth of cut |
| $a_p(j) = j\Delta a_p$ | Axial position |
| if jΔa_p ≤ L_t | if axial position is below helix trans. point then: |
| $\phi_2 = \phi_1 - \dfrac{2\tan\alpha}{D_C}a_p(j)$ | Update the immersion angle due to helix 1 |
| else | |
| $\phi_2 = \phi_1 - \dfrac{2\tan\beta}{D_C}a_p(j)$ | Update the immersion angle due to helix 2 |
| if $\phi_{st} \leq \phi_2 \leq \phi_{ex}$ | If edge is engaged in cut, then |
| $h = f_z \sin\phi_2$ | Chip thickness at this point |
| $\Delta F_t = \Delta a_p k_{c1} h^{1-m_c}\left(1 - \dfrac{\lambda}{\lambda_c^{corr}}\right)$ | Differential tangential force |
| $\Delta F_r = \Delta a_p k_{r1} h^{1-m_r}\left(1 - \dfrac{\lambda}{\lambda_r^{corr}}\right)$ | Differential radial force |
| $\Delta F_x = -\Delta F_t \cos\phi_2 - \Delta F_r \sin\phi_2$ | Differential feed force |
| $\Delta F_y = \Delta F_t \sin\phi_2 - \Delta F_r \cos\phi_2$ | Differential normal force |
| $F_t(i) = F_t(i) + \Delta F_t$ | Sum cutting forces contributed by all edges |
| $F_r(i) = F_r(i) + \Delta F_r$ | |
| $F_x(i) = F_x(i) + \Delta F_x$ | |
| $F_y(i) = F_y(i) + \Delta F_y$ | Total normal force governing the form error |
| else | |
| next j | |
| next k | |
| next i | |

Such force algorithm may then be subjected to an optimization routine. As described previously, the objective function is to be designed such that the variation of the dynamic component of the force should be minimized. This can be achieved by minimizing the difference between the maximum and minimum force amplitudes over the continuous periodic normal cutting force, $F_y$.

To minimize the objective function the optimization algorithm is set to find the best combination of the three variables, α, β and $L_T$ from the cutting force algorithm.

The optimization problem along with the objective function can be formulated as $$\min_{\alpha,\beta,L_t \in \mathbb{P}^3} f(\alpha, \beta, L_t) = |F_y^{max}(\alpha, \beta, L_t) - F_y^{min}(\alpha, \beta, L_t)|$$

Various constraints, for example to favor solutions that are feasible from a production point of view, may be used to facilitate solving the optimization problem. For example, a constraint could relate to a minimum required distance of the transition from the front end. Other constraints could for example relate to maximum and/or minimum helix angles allowed, in order to avoid solutions involving helix angles that are unsuitable for other reasons.

The optimization is performed using a computer. The term "computer" refers to any electronic device comprising a processor, such as a general-purpose central processing unit (CPU), a specific purpose processor or a microcontroller. A computer is capable of receiving data (an input), of performing a sequence of predetermined operations thereupon, and of producing thereby a result in the form of information or signals (an output). Depending on context, the term "computer" will mean either a processor in particular or can refer more generally to a processor in association with an assemblage of interrelated elements contained within a single case or housing.

Any suitable nonlinear programming solver designed for solving nonlinear multivariable functions, may be used. As an example, fmincon, being a built-in function in MAT-LAB®, may be used. The function fmincon is a nonlinear programming solver designed to find the minimum of constrained nonlinear multivariable functions.

The optimization described above may constitute a step in a method for designing a milling tool. The method may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which include storage devices and signals, in compressed or uncompressed form.

An example of the results that the optimization strategy can provide will be presented. In this case a comparison between a single helical concept will be compared with the results after introduction of a second helix at an optimized position along the axial depth of cut. This is a reduced example with respect to the number of variables that are considered in the optimization. A conventional design with five teeth, diameter $D_C$=12 mm, maximum cutting depth $a_p^{max}$=60 mm, and helix angle 42° was considered. In the optimized design, the first helix α is kept the same as in the original design, such that two rather similar solutions can be compared. Hence, only two design variables are passed through the optimization: the second helix β, and the transition point $L_T$.

Figure 5:
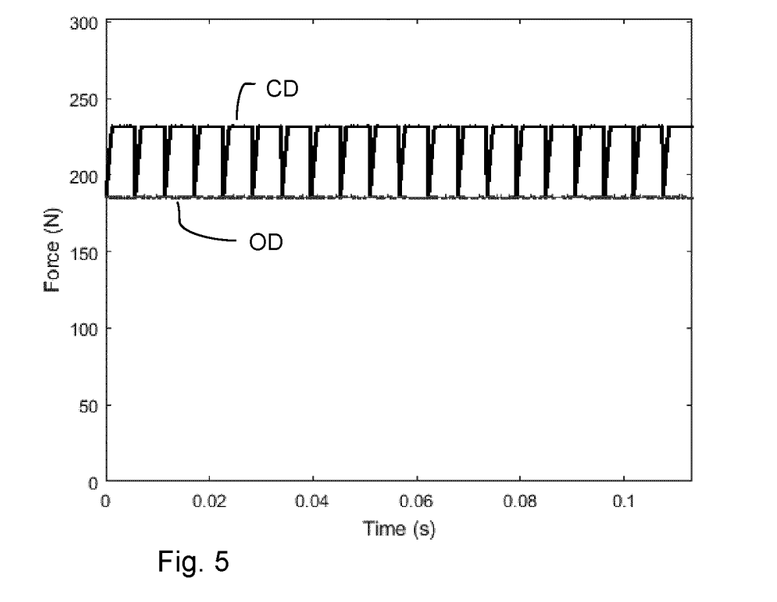
FIG. 5 shows simulated cutting forces, both for a conventional end mill and for an end mill according to the present invention.
Figure 6:
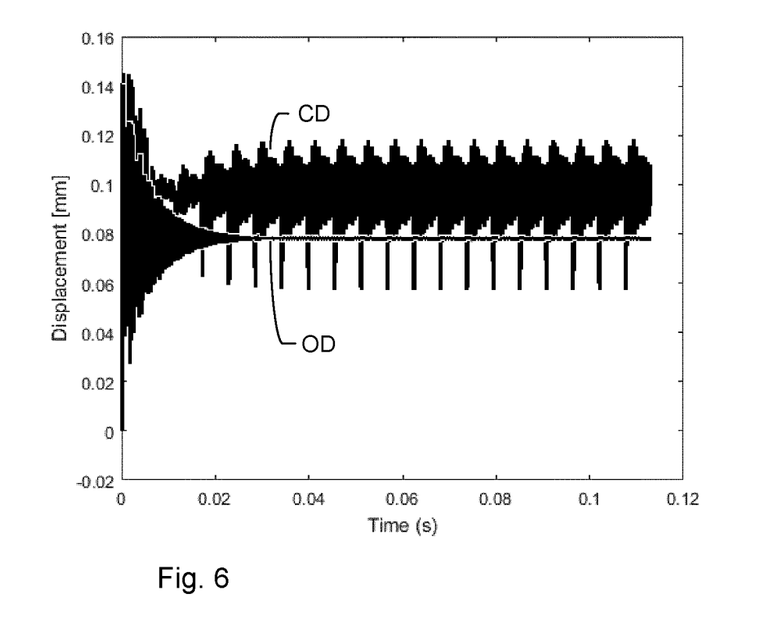
FIG. 6 shows simulated tool displacement as caused by the cutting forces according to FIG. 5.

The optimization resulted in a second helix β=50° and a transition point $L_T$=33.5 mm (i.e. approximately 0.56×$a_p^{max}$). FIG. 5 shows the simulated cutting forces in the Y-direction, both for a conventional design CD with constant helix 42° and the optimized design OD, wherein the cutting depth used is 60 mm (i.e. the maximum cutting depth possible), the radial width of cut is 0.2 mm, the feed rate is 0.08 mm/tooth, the cutting speed is 80 m/min, and the workpiece material is Ti6Al4V. FIG. 6 shows the corresponding simulated response in the Y-direction, i.e. the simulated tool deflection with respect to the generated surface of the workpiece, for the conventional design CD and for the optimized design OD. As seen in FIG. 5, with these cutting conditions, the optimized solution almost eliminates the force variation over time completely, thus significantly reducing the vibrations during cut, as seen in FIG. 6. A similar effect, at least to some extent, would be expected also for other cutting conditions.

In the following, the design of a tool with optimized geometry according to the invention will be described in more detail.

Figure 7:
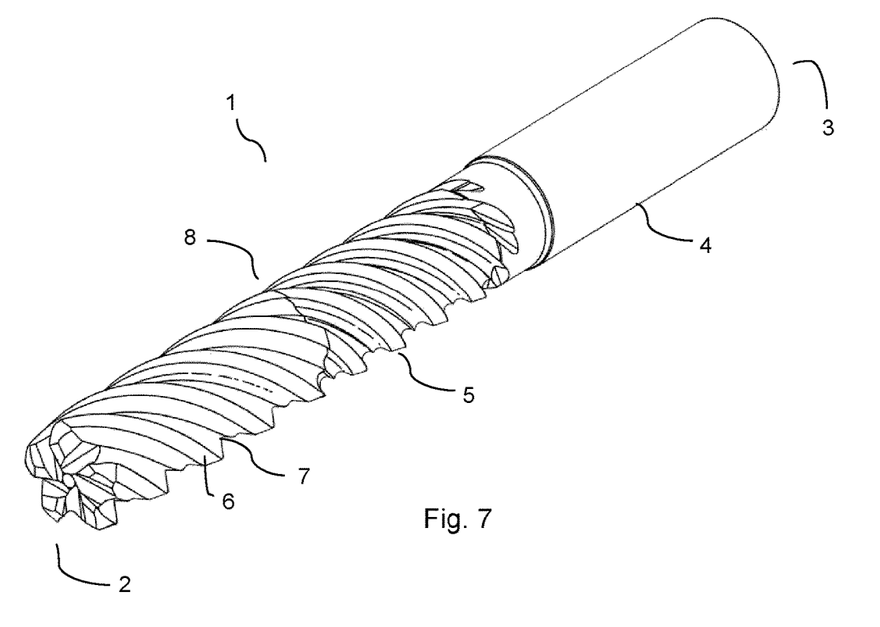
FIG. 7 shows a milling tool according to an embodiment of the invention.

FIG. 7 is an isometric view of a milling tool 1 according to an exemplary embodiment of the invention. The milling tool, which in this case is an end mill, has a front end 2, a rear end 3, a shank portion 4 located at the rear end side, and a cutting portion 5 located at the front end side. A longitudinal axis C extends between the front end 2 and the rear end 3. The cutting portion 5 comprises five cutting teeth 6 and five flutes 7. Each cutting tooth 6, and each corresponding flute 7, extends from the front end along a first helix angle to a transition 8, at which the helix angle is changed.

Figure 8:
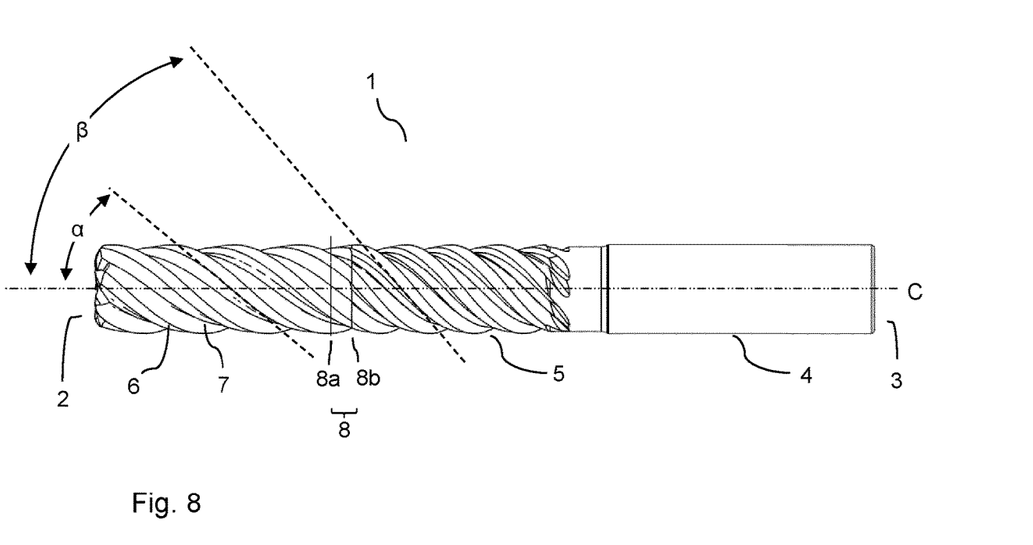
FIG. 8 is a side view of the milling tool in FIG. 7.

The transition 8 is shown in FIG. 7 as a distinct, sudden transition between the different helix angles, and indicated by a line. However, even though a short transition may be beneficial, the transition may also be a smooth transition extending over a certain axial distance of the tooth. In practice, it may be difficult to obtain a completely abrupt transition. Hence, the transition may be considered as a transition region, having a certain extension along the longitudinal axis. This is illustrated in FIG. 8 wherein it can be seen that each tooth 6 extends along a first helix angle α from the front end to an axial point 8a at which the transition region begins. The transition region ends at another axial point 8b, from which the tooth extends along a second helix angle β towards the shank 4.

Preferred combinations of helix angles α and β, and locations of the transition $L_T$, for various tools having different dimensions, were found by computer simulation and optimization, as discussed above. Preferred designs of the milling tools, based on the optimization results, are shown in table 1.

TABLE 1

| Diameter (Dc) | Ax. length of cutting portion ($a_p^{max}$) | Helix 1 (α) | Helix 2 (β) | Transition point ($L_T$) | Ratio $L_T/a_p^{max}$ |
|---|---|---|---|---|---|
| 6 | 30 | 45,0 | 48,0 | 15,0 | 0,50 |
| 12 | 60 | 42,0 | 50,00 | 33,0 | 0,55 |
| 18 | 90 | 38,0 | 45,00 | 57,6 | 0,64 |
| 25 | 125 | 38,0 | 50,00 | 80,0 | 0,64 |

In table 1, the transition point $L_T$ is the location, measured from the front end of the milling tool, at which the second helix angle β begins, i.e. the end of the transition region. In the example embodiments according to table 1, the transition region of the 6 mm tool has an axial length of 5 mm, the transition region of the 12 mm tool has an axial length of 10 mm, and the transition region of the 18 mm and 25 mm tools has an axial length of 15 mm, such that, for example, the 12 mm tool has a transition starting at an axial distance of 23 mm from the front end, and ending at an axial distance of 33 mm from the front end.

Tests on prototypes showed that the form error of the machined surface was reduced when using any of the tools according to table 1.

Favorable results, at least to some extent, would be expected for any design not deviating too much from those disclosed in table 1, with respect to the helix angles α and β, i.e. within small ranges around the optimized parameters. Hence, helix combinations not too far from those in table 1, i.e. ±5° of any of the angles α and β, may result in reduced force variation and thus improved surface finish, as long as the difference between a and (3 is at least 2° and at most 15°. The ratio $L_T/a_p^{max}$ may preferably be within the range 0.4-0.7 (meaning that the transition, in view of similar transition region lengths as those mentioned above, will be located within a distance, from the front end of the milling tool, of 0.2 to 0.7 of the longitudinal length of the cutting portion).

Figure 9:
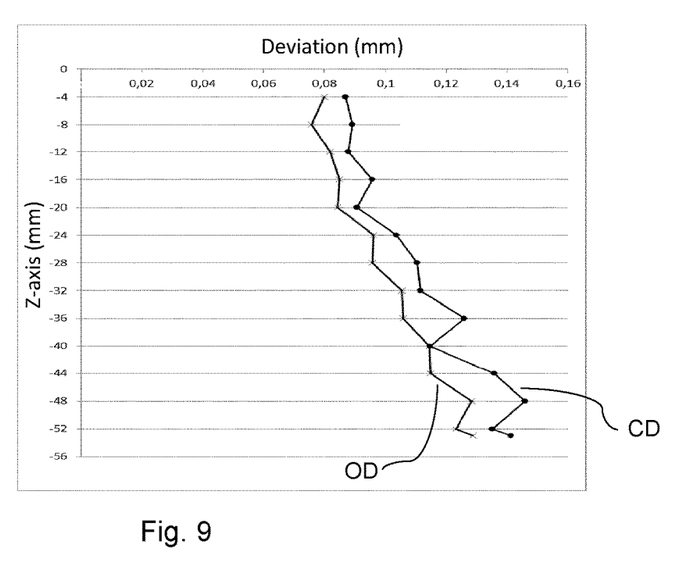
FIG. 9 illustrates the form error, as measured on a workpiece, resulting from machining with a milling tool according to the invention compared to a conventional milling tool.

FIG. 9 shows measurements of the form error resulting from machining a Titanium alloy (Ti6Al4V) workpiece with a milling tool with diameter 12 mm according to table 1 (optimized design OD) in comparison with a conventional milling tool with the same diameter (conventional design CD), using a depth of cut $a_p$=60 mm (i.e. corresponding to the maximum depth of cut $a_p^{max}$), a radial width of cut $a_e$=0.2 mm, a feed rate of 0.04 mm/tooth and a cutting speed of 120 m/min. As can be seen in FIG. 9, in this example when using these cutting conditions, the global error is somewhat smaller for the optimized design. More important in view of the present disclosure, though, is that the "waviness" of the generated surface, i.e. how much the deviation fluctuates along the Z-axis (corresponding to the longitudinal axis of the tool), is also significantly smaller for the optimized design, which is a consequence of using the variable helix configuration as described above.

Figure 10:
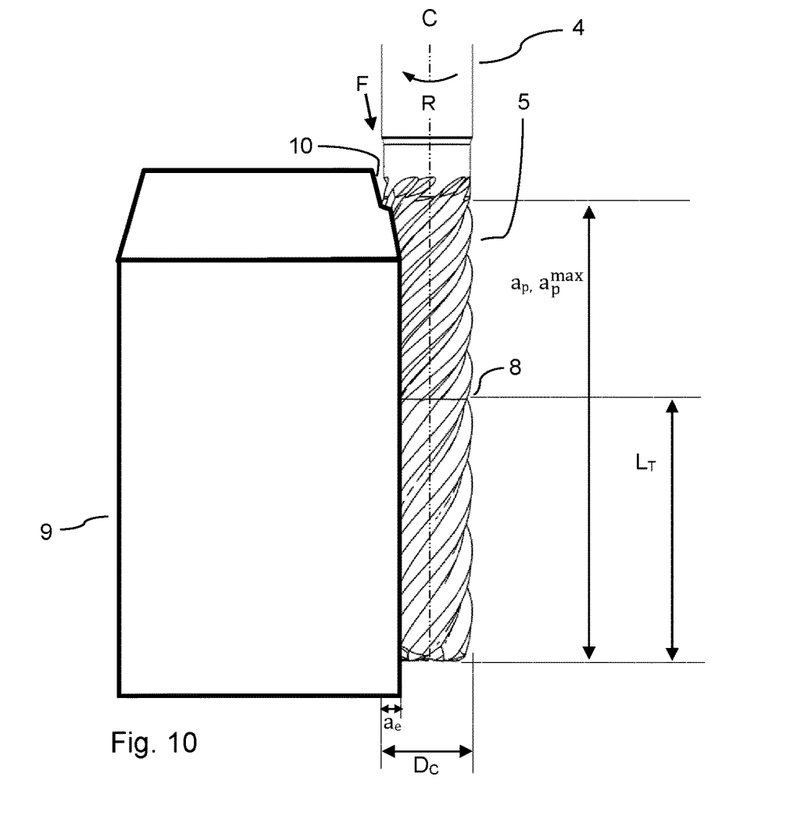
FIG. 10 illustrates a machining method according to the present invention, showing a milling tool in machining engagement with a workpiece.

In FIG. 10, an end mill according to the present disclosure is shown in engagement with a workpiece 9 during machining. The end mill in this example corresponds to the 12 mm end mill according to table 1 above. In this machining operation, a surface 10 of the workpiece is cut when the end mill 1 is rotated around the longitudinal axis C in a rotation direction R and moved in a feed direction F transversal to the longitudinal axis. The axial length of the cutting portion, i.e.

the maximum cutting depth possible $a_p^{max}$, is five times the diameter $D_C$. The transition 8 is axially located at an axial depth $L_T$ of 2.75 times the diameter $D_C$ (or, in other words, 0.55 times the maximum cutting depth $a_p^{max}$). In this example, the actual cutting depth $a_p$ corresponds to the maximum cutting depth $a_p^{max}$. The radial width of cut $a_e$ is 0.2 mm, corresponding to approximately 1.7% of the cutting diameter $D_C$. Since the cutting depth $a_p$ exceeds the required depth $L_T$, the improved surface finish according to the invention will be obtained. This is because a cutting edge of at least one tooth at an axial position corresponding to the first helix angle and a cutting edge of at least one tooth at an axial position corresponding to the second helix angle will, at all times during the machining operation, simultaneously be in engagement with the workpiece. In particular, since the cutting depth $a_p$ corresponds to the maximum cutting depth $a_p^{max}$, at which the effect will be most prominent, and the width of cut $a_e$ is below 7% of the cutting diameter $D_C$, the reduction of the form error will be significant. In FIG. 10, the transition 8 is indicated as an abrupt transition, but as discussed previously, the transition may be extended and comprise a transition region, in which case the line shown in FIG. 10 corresponds to the location at which the transition is completed, and the second helix angle begins.

The invention claimed is:

1. A milling tool comprising:
   a front end, a rear end, and a longitudinal axis extending therebetween;
   a shank portion; and
   a cutting portion, which extends along the longitudinal axis from the front end towards the shank portion, the cutting portion including a plurality of teeth separated from each other by a corresponding number of flutes, wherein the teeth extend axially along the cutting portion following a curved helical path around the longitudinal axis, wherein each tooth extends at a first helix angle ($\alpha$) from the front end to a helix transition, and at a second helix angle ($\beta$) from the helix transition towards the shank portion, wherein the second helix angle ($\beta$) is greater than the first helix angle ($\alpha$) by at least 2° and at most 15°, the first helix angle ($\alpha$) fulfills 33°≤$\alpha$≤50°, the second helix angle ($\beta$) fulfills 40°≤$\beta$≤55°, and the helix transition is axially located within a distance, from the front end, of 0.4 to 0.7 of a longitudinal length of the cutting portion.

2. The milling tool according to claim 1, wherein the first helix angle ($\alpha$) fulfills 38°≤$\alpha$≤45°, and the second helix angle ($\beta$) fulfills 45°≤$\beta$≤50°.

3. The milling tool according to claim 1, wherein the second helix angle ($\beta$) is selected from 3°, 7°, 8° or 12° greater than the first helix angle ($\alpha$).

4. The milling tool according to claim 1, wherein the longitudinal length of the cutting portion is at least 3 times a diameter of the cutting portion.

5. The milling tool according to claim 1, wherein the longitudinal length of the cutting portion is 5 times, or substantially 5 times, a diameter of the cutting portion.

6. The milling tool according to claim 1, wherein the number of teeth is five or six.

7. The milling tool according to claim 1, wherein the helix transition includes a transition region extending in the axial direction from a first axial point of the cutting portion at which the helix transition starts to a second axial point of the cutting portion at which the helix transition ends.

8. A milling tool according to claim 7, wherein the axial length of the transition region is between 0.05 and 0.2 times the axial length of the cutting portion.

9. A method for machining a surface of a workpiece with a milling tool according to claim 1, the method comprising machining the workpiece using a cutting depth as measured in a direction parallel to the longitudinal axis of the milling tool, that is larger than, for each tooth, an axial distance as measured along the longitudinal axis of the milling tool from the front end of the milling tool to a point of the tooth at which the second helix angle begins.

10. The method according to claim 9, wherein the cutting depth is the same, or substantially the same, as the full axial length of the cutting portion as measured in a direction parallel to the longitudinal axis of the milling tool.

11. The method according to claim 9, further comprising machining the workpiece with a width of cut in a direction transversal to the longitudinal axis that is at most 7% of a diameter of the cutting portion.

12. A method for designing a milling tool having a front end, a rear end, and a longitudinal axis extending therebetween, wherein the milling tool comprises a shank portion and a cutting portion, which extends along the longitudinal axis from the front end towards the shank portion, and a plurality of teeth separated from each other by a corresponding number of flutes, wherein the teeth extend axially along the cutting portion following a curved helical path around the longitudinal axis, wherein each tooth extends at a first helix angle from the front end to a helix transition, and at a second helix angle from the helix transition towards the shank portion, wherein the method comprises the steps of:
   subjecting a force algorithm, designed for calculation of simulated cutting force during simulated machining of a surface of a workpiece with a milling tool, to an optimization routine in which the objective is to minimize the difference between the maximum force and the minimum force in a direction normal to the surface of the workpiece, and in which the variables are at least two of:
   the first helix angle ($\alpha$),
   the second helix angle ($\beta$), and
   an axial location of the helix transition along the cutting portion; and, designing the milling tool on basis of the combinations of the first helix angle, the second helix angle, and the axial location of the helix transition, found to be optimal.

13. The method according to claim 12, wherein the variables in the optimization routine includes all of the first helix angle, the second helix angle, and the axial location of the helix transition along the cutting portion.

14. A computer program having instructions, which when executed by a computing device or system, cause the computing device or system to perform the method according to claim 12.

* * * * *